Patented Nov. 18, 1947

2,430,897

UNITED STATES PATENT OFFICE 2,430,897

PROCESS FOR VAPOR-PHASE DEHYDROCHLORINATION

George R. Van Atta, Berkeley, and David F. Houston, El Cerrito, Calif., assignors to United States of America as represented by the Secretary of Agriculture No Drawing. Application August 11, 1944, Serial No. 549,082

8 Claims. (Cl. 260—405.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to the preparation of unsaturated derivatives of long-chain fatty acids through manipulation of chlorinated fatty acids or their esters. The products of the invention may be used in the manufacture of soap or other detergents in which good solubility, wetting power, and free lathering properties are needed, and in the manufacture of drying oils and plasticizers.

Methods previously used or proposed for increasing unsaturation in fatty acids through operations upon chlorinated acids or esters may be divided into two main classes, namely:

1. Removal of hydrogen chloride from the liquid chlorinated acid or esters with heat.
2. Treatment of soaps of chlorinated acids with heat in the presence of water.

In the second type of treatment hydroxylation as well as unsaturation can occur.

Distinction between variations of these two methods has rested in the past upon choice of chlorinating agent, or alkali, and use or nonuse of catalysts, diluents, and materials to absorb or react with the hydrogen chloride evolved. Although various temperatures and pressures have been employed, there has been apparently no attempt to vaporize completely the chlorinated long-chain fatty materials and to accomplish unsaturation while the materials are in the vapor phase.

We have found that it is not practicable to dehydrochlorinate chlorinated fatty acids or their esters by heating the liquid materials at atmospheric pressure. For example, in periods of heating at 200° C. of 8 to 15 hours in an inert atmosphere and under strong agitation, only about half the chlorine was removed from chlorinated palmitic acid which originally contained between 21.5 and 22 percent of chlorine. Moreover, such long periods of heating appeared to encourage undesired side reactions, and at least the bulk of the remaining chlorine appeared to be held no more firmly than that removed earlier in the process, since further quantities could be removed by continued heating under the same conditions. Further evidence of this progressive decomposition is observed when attempts are made to free the products of their very dark color by vacuum distillation. Substantially all the combined chlorine must be removed from such materials if clear, pale, and stable products are to be obtained by vacuum distillation.

Dehydrochlorination is promoted by raising the temperature of the chlorinated material, but other reactions leading to the decomposition of the unsaturated residue are also encouraged by heating. The effect of these latter reactions becomes excessive if attempts are made to effect substantially complete dehydrochlorination by increasing treatment temperature alone.

Reduction of pressure favors dehydrochlorination in accordance with the law of mass action, but so long as the chlorinated fatty material remains liquid the process is slow and the other disadvantages mentioned persist. We have found, however, that if dehydrochlorination is conducted under conditions of temperature and reduced pressure in which the reaction takes place in the vapor phase, separation of hydrogen chloride from the molecules of chlorinated fatty material is greatly accelerated and at the same time other types of decomposition favored by either prolonged heating or very high temperature are minimized.

In the process described herein, unsaturation is produced in chlorinated fatty acids or their esters by heating them in the absence of air to a temperature above that at which they boil under the reduced pressure employed. It is necessary to maintain the reacting materials in the vapor phase for only a very brief period in order to effect substantially complete dehydrochlorination of the chlorinated fatty materials. After this short period (about 0.5 to 5 seconds) of heating, the vapors, still under reduced pressure, are cooled promptly to such a temperature that all their components except hydrogen chloride and perhaps a small quantity of water produced by side reaction are condensed to liquid. The hydrogen chloride, which after cooling remains in the gaseous phase, is withdrawn by suction to be separately recovered or disposed of as desired.

By processing in the manner outlined, the following ends are achieved:

1. Vapor-phase dehydrochlorination is accomplished in a very brief period of heating, in contrast to the prolonged treatment necessary in liquid-phase operations.

2. Besides effecting an economy in time, the short period of heating lessens opportunity for formation of undesired products of side reactions.

3. Dehydrochlorination is carried far beyond the limits practicable in liquid-phase operations performed on the free acids or esters.

4. Clear, pale-colored unsaturated products, which are stable with respect to color and chlorine content, can be readily obtained by distillation. The distillation can be conducted separately on the products of vapor-phase dehydrochlorination or it can be made a step in the dehydrochlorination process itself. Recovery of pale, stable products in this manner is possible by reason of the very low levels of residual chlorine readily attainable in the products of the process. The alkali soaps of these products are excellent detergents, resembling coconut-oil soaps in solubility and in emulsifying, lathering, and wetting power.

5. Vapor-phase dehydrochlorination, being conducted in the absence of air, avoids unwanted oxidation during heat treatment.

6. Since dehydrochlorination is effected without the addition of reagents or diluents, their cost is avoided and the products are obtained without contamination from such sources.

7. Vapor-phase dehydrochlorination, in contrast to other methods, is especially suited to continuous-type operations with their characteristic opportunities for cost economies.

8. Dehydrochlorination is effected without hydroxylation. In processes involving use of water and alkali, hydroxy compounds are formed in variable quantity.

In accordance with this invention, chlorinated fatty acids or their esters in the liquid state are fed at controlled rates into a heated, packed, and evacuated reaction chamber where they are instantaneously vaporized. Disruption of the chlorinated material begins immediately and continues during the very brief interval required for the vapors to traverse the chamber to the outlet under the influence of suction. Upon emerging from the reaction chamber the vapors enter a heat exchanger, where the now unsaturated fatty material is condensed to a liquid by cooling.

From the heat exchanger, the liquefied product flows into receiving vessels. During continuous operations, the stream of product is directed by means of valves alternately into one and another of the collectors. This permits withdrawal of the product from the collectors as they become filled without interrupting the dehydrochlorination process.

The hydrogen chloride remains in the vapor phase and passes from the heat exchanger through an outlet under the influence of suction. It is of high purity, substantially free from water, and is suitable for recovery either as anhydrous hydrogen chloride or aqueous hydrochloric acid.

Design of the dehydrochlorination equipment, selection of mechanical accessories, and position of the various parts of the apparatus are matters in which wide freedom of choice may be exercised. In one of the forms of the apparatus that has proved convenient, the reaction chamber, condenser, and product receiver were arranged vertically, one above the other so that chlorinated material fed in at the top of the reaction chamber was delivered as product to receivers at the bottom of the assembly. The unsaturated material produced by this type of apparatus is dark-colored because of the presence of small quantities of tarry substances formed in the reaction chamber. This crude product can be refined and freed of these dark-colored impurities by separate vacuum distillation.

Another form of the apparatus accomplishes dehydrochlorination and refinement in a continuous manner. In this instance, the vapors leaving the reaction chamber are led directly into the lower part of a vertical distillation column where separation of the volatile products and the non-volatile impurities occurs. The non-volatile impurities flow to a receiver at the bottom of the column, while the purified product vapors, together with the hydrogen chloride gas, pass out at the top of the column to a condenser. The hydrogen chloride passes through the condenser and out of the system in the vapor phase, while the unsaturated material is cooled and condensed to a pale clear product which is collected in appropriate receivers.

Considerable latitude in choosing the materials to be used for constructing the dehydrochlorinator is also permissible. Thus, for example, in various satisfactory forms of the apparatus, reaction chambers and condensers have been of glass, porcelain, and stainless steel tubings. Packings for the reaction chamber have been of granular charcoal, ceramic plate shards, and stainless steel. The reaction tube has also been used without packing, although under this circumstance the efficiency of the reaction chamber per unit volume is low.

The following examples of dehydrochlorinations were all performed in an apparatus which had a reaction chamber made of stainless steel tube having an inside diameter of 1⅛ inches and a length of 35 inches. The chamber was loosely packed with crimped and twisted strips of stainless steel sheet. The sectional area of the remaining free space in the chamber was 0.975 square inch. In each instance 250 grams of the chlorinated material was fed into one end of the reaction chamber at a steady rate throughout the period, while the dehydrochlorinated product and hydrogen chloride formed in the treatment were continuously removed at the other end at a corresponding rate and immediately cooled to room temperature. In each instance, the time shown is the interval between the beginning of the flow of the chlorinated material into the reaction chamber and the leaving of the last of the resulting gas. This time is not to be confused with the length of time a single particle of the reacting material remains in the reaction chamber. As indicated above, the latter time amounts at most to only a very few seconds.

Chlorinated fatty substances used as starting materials in the dehydrochlorination examples shown hereinafter may be described as follows:

| Example Number | Starting Material |
|---|---|
| 1 | Product obtained by direct chlorination of U. S. P. grade oleic acid. The chlorinated acid contained 21.5 per cent of combined chlorine and had a Wijs iodine value of 0.83. |
| 2 | Product obtained by direct chlorination of highly purified palmitic acid. This chlorinated acid contained 35.6 per cent of combined chlorine. |
| 3 | Chlorinated methyl palmitate prepared by direct chlorination of highly purified methyl palmitate. The starting material contained 21.6 per cent of combined chlorine. |
| 4 | Chlorinated tri-palmitin prepared by direct chlorination of highly purified tri-palmitin. The chlorine content of the starting material was 20.6 per cent. |
| 5 | Product obtained by directly chlorinating distilled stearic acid (Armour's Neo-fat 1-56). Combined chlorine in the halogenated acid amounted to 20.1 per cent. |
| 6 and 7 | Product containing 22.1 per cent of combined chlorine prepared by direct chlorination of highly purified palmitic acid. |

Table I

| Example Number | Treatment Conditions | | | Product Analyses | |
|---|---|---|---|---|---|
| | Temperature, °C. | Pressure, mm. Hg | Time, minutes | Chlorine, Per cent | Iodine Value, Wijs |
| 1 | 360 | 30 | 95 | 0.8 | 106.0 |
| 2 | 360 | 30 | 235 | 2.5 | 195.8 |
| 3 | 362 | 51 | 258 | 6.8 | 117.8 |
| 4 | 363 | 30 | 221 | 2.4 | 133.3 |
| 5 | 365 | 30 | 102 | 2.0 | 125.8 |
| 6 | 275 | 30 | 72 | 2.8 | 124.5 |
| 7 | 477 | 45 | 116 | 0.6 | 150.8 |

The foregoing examples are illustrative only and are not to be considered as limiting the range of the process with respect to either starting materials, conditions of treatment, or characteristics of products obtainable.

Dehydrochlorination, in accordance with this invention, is an endothermic process. This is equivalent to saying that energy in the form of heat supplied to the chlorinated materials causes the dehydrochlorination reaction to take place. This reaction is also favored by reduction of pressure. The reverse reaction, hydrochlorination, of the unsaturated material, is exothermic and is favored by increase in pressure. The foregoing principles are operative regardless of whether the process is conducted while the fatty material is in the liquid or in the gas phase. Thus, the net changes in the rates of dehydrochlorination in either the liquid or gas phase may be expressed as continuous functions of both temperature and pressure. At those points of temperature and pressure, however, at which the liquid vaporizes or the gas condenses, relatively large changes in rates occur; the minimum rates in the vapor phase being much greater than the corresponding maximum rates in the liquid phase. Various reactions other than dehydrochlorination can and do take place to variable degrees when chlorinated acids or their esters are heated. These reactions, which include such processes as polymerization, decarboxylation and cracking of the aliphatic portions of the fatty molecules, are favored by increasing either temperature, time of heating, or both. In general, they lead to the production of dark-colored and otherwise undesirable products.

Although successful practice of the invention must take cognizance of the foregoing principles, considerable latitude in choice of operating conditions is available. Selection of treatment temperature, pressure and time of heating to be used is also influenced by the identity of the particular chlorinated material to be processed as well as the mechanical facilities available for the operation, the grade of product desired, and other practical considerations. For these reasons, it is not feasible to set minimum or maximum limits for the three main variables: temperature, pressure, and time of heating. It may be stated by way of illustration, however, that dichlorinated palmitic acid is vaporized at about 250° C. when under a pressure of about 25 millimeters of mercury, while at about 1 millimeter of pressure vaporization takes place below 200° C. The maximum temperature, and thus indirectly the maximum pressure that can be employed in a particular case, is governed largely by consideration of the maximum decomposition that can be tolerated in the product.

The time of heating in all cases needs to be only very short. The following table shows, by way of illustration, a few of the numerous examples available. The time of heating shown includes the entire period between the time the chlorinated fatty material at room temperature entered the reaction chamber and the time the same material reached the condenser to be cooled.

Table 2

| Per cent chlorine in fatty material | | Maximum temperature during heating in ° C. | Pressure in millimeters of mercury | Approximate time of heating in seconds |
|---|---|---|---|---|
| Before heating | After heating | | | |
| 22.1 | 2.8 | 275 | 30 | 1.6 |
| 22.1 | 2.0 | 425 | 28 | 1.1 |
| 22.1 | .8 | 525 | 30 | .9 |
| 35.6 | 2.4 | 360 | 30 | 4.6 |

Since acids with 16 and 18 carbon atoms per chain are among the commonest of the long-chain fatty acids in quantity, and since their chemical behavior is representative of the whole class, the illustrative examples given deal with these acids. Application of the invention, however, is not limited to the chloro derivatives of these particular acids or their compounds, but can include the corresponding compounds of acids with either shorter or longer chains.

The degree of chlorination of the halogenated compounds used in the process is governed by the degree of unsaturation desired in the product, the physical character of the chlorinated material, and other like practical considerations.

The necessary condition for dehydrochlorination in the manner that has been indicated is that a chlorine atom in the starting material be attached by a valence bond to a carbon atom linked to a second carbon atom which in turn holds a hydrogen atom. It is evident, therefore, that the invention in practice may be extended beyond the fields that have been specifically mentioned.

Having thus described our invention, we claim:

1. The process of dehydrochlorinating a compound selected from the group consisting of chlorinated palmitic acid, methyl esters of chlorinated palmitic acid, glyceryl esters of chlorinated palmitic acid, chlorinated stearic acid, methyl esters of chlorinated stearic acid, and glyceryl esters of chlorinated stearic acid, which comprises heating the compound in the vapor phase below atmospheric pressure until the dehydrochlorination is effected.

2. The process of dehydrochlorinating a compound selected from the group consisting of chlorinated palmitic acid, methyl esters of chlorinated palmitic acid, glyceryl esters of chlorinated palmitic acid, chlorinated stearic acid, methyl esters of chlorinated stearic acid, and glyceryl esters of chlorinated stearic acid which comprises heating the compound in the vapor phase below atmospheric pressure for about 0.5 to 5 seconds.

3. The process of dehydrochlorinating a compound selected from the group consisting of chlorinated palmitic acid, methyl esters of chlorinated palmitic acid, glyceryl esters of chlorinated palmitic acid, chlorinated stearic acid, methyl esters of chlorinated stearic acid, and glyceryl esters of chlorinated stearic acid which comprises heating the compound in the vapor phase at a temperature from 275° C. to 477° C. and at a pressure below atmospheric until the dehydrochlorination is effected.

4. The process of dehydrochlorinating a compound selected from the group consisting of chlorinated palmitic acid, methyl esters of chlorinated palmitic acid, glyceryl esters of chlorinated palmitic acid, chlorinated stearic acid, methyl esters of chlorinated stearic acid, and glyceryl esters of chlorinated stearic acid which comprises heating the compound in the vapor phase at a pressure in the range of about 30 to 51 mm. until the dehydrochlorination is effected.

5. The process of dehydrochlorinating a compound selected from the group consisting of chlorinated palmitic acid, methyl esters of chlorinated palmitic acid, glyceryl esters of chlorinated palmitic acid, chlorinated stearic acid, methyl esters of chlorinated stearic acid, and glyceryl esters of chlorinated stearic acid which comprises heating the compound in the vapor phase at a temperature from 275° C. to 477° C. and at a pressure in the range of about 30 to 51 mm. until the dehydrochlorination is effected.

6. The process of dehydrochlorinating chlorinated palmitic acid which comprises heating said acid in the vapor phase below atmospheric pressure until the dehydrochlorination is effected.

7. The process of dehydrochlorinating the methyl ester of chlorinated palmitic acid which comprises heating said ester in the vapor phase below atmospheric pressure until the dehydrochlorination is effected.

8. The process of dehydrochlorinating chlorinated stearic acid which comprises heating said acid in the vapor phase below atmospheric pressure until the dehydrochlorination is effected.

GEORGE R. VAN ATTA.
DAVID F. HOUSTON.

REFERENCES CITED

The following references are of record in the file of this patent:

UNITED STATES PATENTS

| Number | Name | Date |
|---|---|---|
| 1,452,553 | Gardner | Apr. 24, 1923 |
| 1,862,596 | Keller | June 14, 1932 |
| 1,896,467 | Scheiber | Feb. 7, 1933 |
| 2,288,580 | Baehr et al. | June 30, 1942 |